INVENTOR.
JOHN J. CHAPARRO

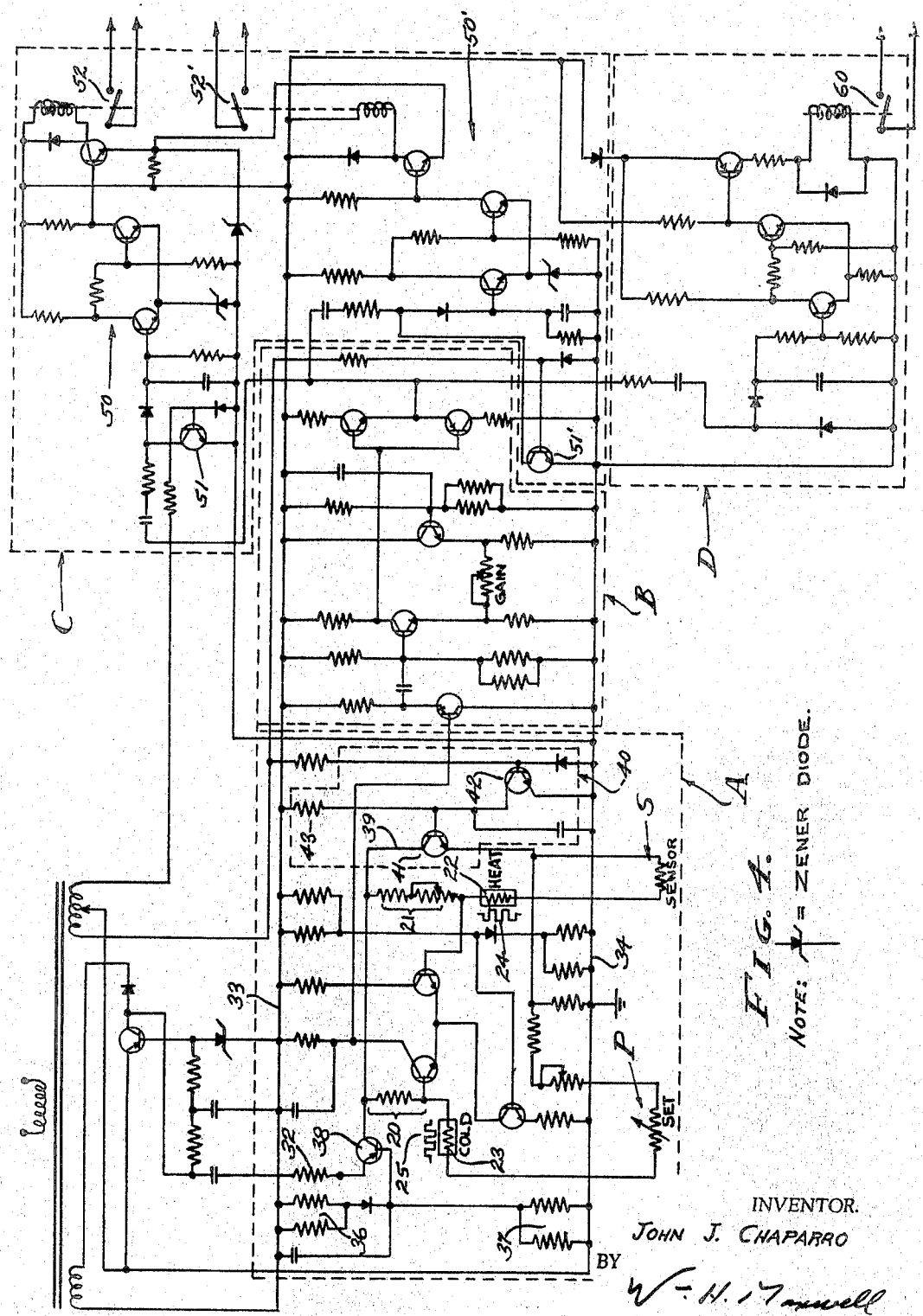

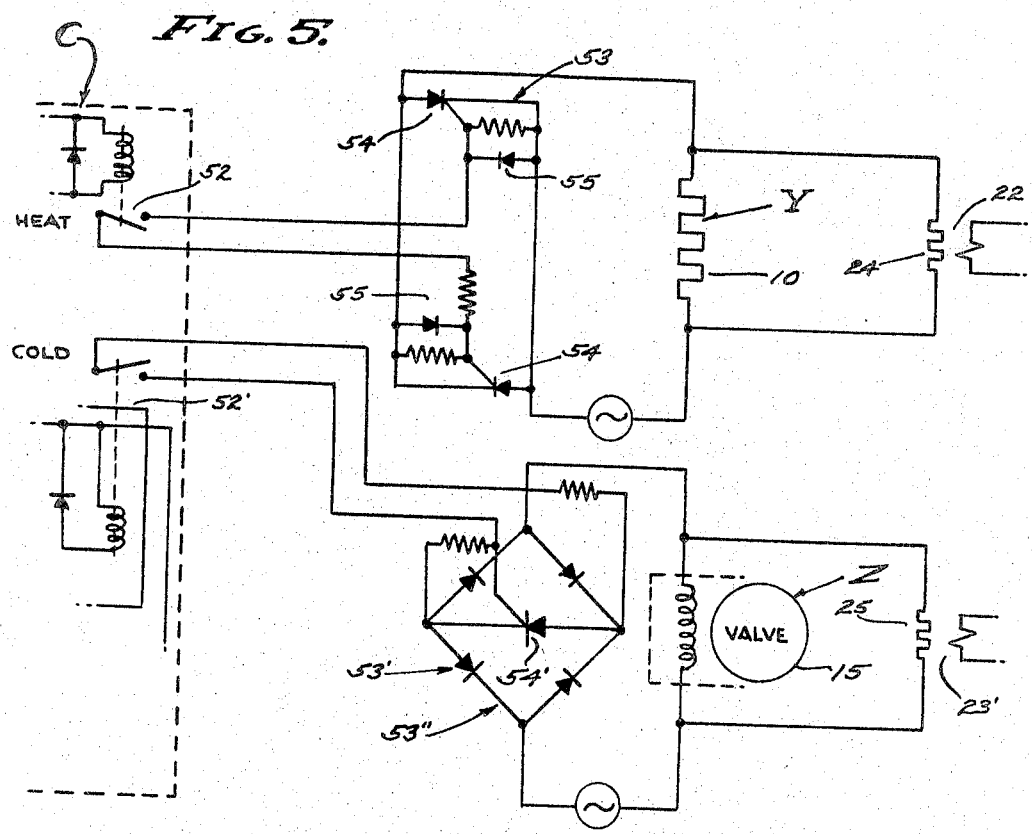

United States Patent Office

3,488,757
Patented Jan. 6, 1970

1

3,488,757
COMPARATOR WITH BRIDGE FOR SENSING AND AFFECTING CONDITIONS
John J. Chaparro, San Diego, Calif., assignor to Delta Design, Inc., La Mesa, Calif., a corporation of Delaware
Original application Sept. 3, 1965, Ser. No. 484,988, now Patent No. 3,371,708, dated Mar. 5, 1968. Divided and this application Oct. 16, 1967, Ser. No. 675,682
Int. Cl. G01r 17/02; G05f 1/10
U.S. Cl. 323—70                    6 Claims

ABSTRACT OF THE DISCLOSURE

A bridge comparator wherein two heat sensitive resistances each have a condition anticipator comprising a heater. Each heater is activated by a separate device. The resistances are so related that heat generated at one of the resistances is radiated to and absorbed by the remaining resistance.

---

This application is a restriction and division of application Ser. No. 484,988, filed Sept. 3, 1965 and issued Mar. 5, 1968 as Letters Patent No. 3,371,708 entitled Electronic Comparator for Sensing and Affecting Conditions.

Temperature chambers can vary widely in size and in intended purpose. However, regardless of the use, it is advantageous that such chambers be closely controlled so as to remain "ON" temperature as selected, and this is especially so in environmental test furnaces which are required to be very accurate. Therefore, overshooting and/or undershooting of a selected temperature, or hunting above and below the desired temperature, is to be avoided. In other words, it is ordinarily difficult with apparatus of the type under consideration to maintain selected temperature near ambient. That is, the need for heat or coolant application can change suddenly due to the load changes within a chamber or to the surrounding temperature changes; and with the present invention absolute and correct determination is automatically made so as to activate or deactivate either a heating applicating means or a coolant applicating means, or to withhold both of the same as circumstances require.

A general object of this invention is to provide a control with characteristics that are not affected by the changes in selected operating factors or temperature set points. With the present invention there is no loss of controller sensitivity at the various selected operating levels or temperatures. And, an operating factor is the ability to approach a selected temperature level directly with anticipation of arriving on the same and without overshooting or undershooting said level.

An object of this invention is to anticipate the coincidence of actual temperature with a preselected and required temperature, whereby the actual temperature is either raised or lowered so as to arrive exactly at the preselected and required temperature. With the control of the present invention the application of heating and cooling is withheld and the requirement for application of either heating or cooling is anticipated. In practice there is substantial residual heat in the physical parts involved, whereby the transition of temperature conditions is naturally damped.

Another object of this invention is to advantageously employ a bridge circuit per se as the modulator that converts direct current information into an alternating current signal which can be amplified for the separate control of two opposite functions, one the application of heat and the other the applications of cold.

2

It is still another object of this invention to advantageously combine a bridge circuit and a chopper so as to render the said bridge circuit operable to produce a modulated signal which can be separated by demodulation so as to control distinct functions, for example two distinct functions having opposite effect respectively. With the present invention a constant current is supplied to the said bridge circuit and which current is repeatedly shunted by the chopper at a constant rate so as to interrupt the sensor function and to thereby produce an intermittent signal at a constant cycle.

It is also an object of this invention to provide thermo compensated anticipation in a bridge circuit for the control of temperature conditions. With the present invention the anticipators are temperature sensitive resistors that are included as principle elements of the said bridge circuit and which are such as to change in resistance in response to the manual setting of a controller. That is, the temperature sensitive resistors change resistance when there is a control output change at the controller, said controller being a variable potentiometer used and set manually to maintain a desired temperature condition.

It is still another object of this invention to provide a null contact circuit which closes relay contacts when the temperature conditions and the controller are the same, or when the temperature condition being measured is equal to that selected. This null contact circuit has utility in activating other circuits, such as programmers for related equipment.

The present invention involves temperature conditions which are maintained to best advantage within the confines of a chamber, and in accordance with this concept as a requirement, the invention will be described as it is related to a temperature chamber. The particular chamber hereinafter described is automatically supplied with the required amount of heating or cooling as determined by a sensor and the control which activates or deactivates heating means or cooling means. The said heating means is preferably electrically powered while the said cooling means is preferably a gas expansion means. Radio interference and/or electrical magnetic interference is minimized by the utilization of silicon controlled rectifiers to switch heavy currents to the electrical heater of the heating means and to the electrical solenoid valve of the cooling means. That is, solid state switches continue to conduct current in the inductive lead until the said current decreases substantially to zero. By employing the modulated bridge circuit and thermo compensated anticipators incorporated therein, it is possible to manually select and set the controller at the desired temperature without affect to the chamber by ambient temperatures which ordinarily adversely affect chambers of the type under consideration. Also, adverse changes in controller sensitivity as caused by operating at various temperature settings are virtually eliminated. In a conventional Wheatstone bridge energized by alternating voltage the sensitivity of the bridge per se is a function of the operating temperature of the sensor involved, a sensor such as a Nickle element sensor which has a higher resistance value at higher temperatures and which reduces the effective sensitivity of the bridge and which ordinarily adversely affects the ability to measure error in temperature.

The various objects and features of this invention will be fully understood from the following detailed description of the typical preferred form and application thereof, throughout which description reference is made to the accompanying drawings, in which:

FIG. 4 is a detailed electrical diagram of a preferred embodiment of the present invention, and FIG. 5 is an extension of FIG. 4 (to the right thereof) and shows the solid state contactors which are activated by the control circuit that is provided.

Figure 1:
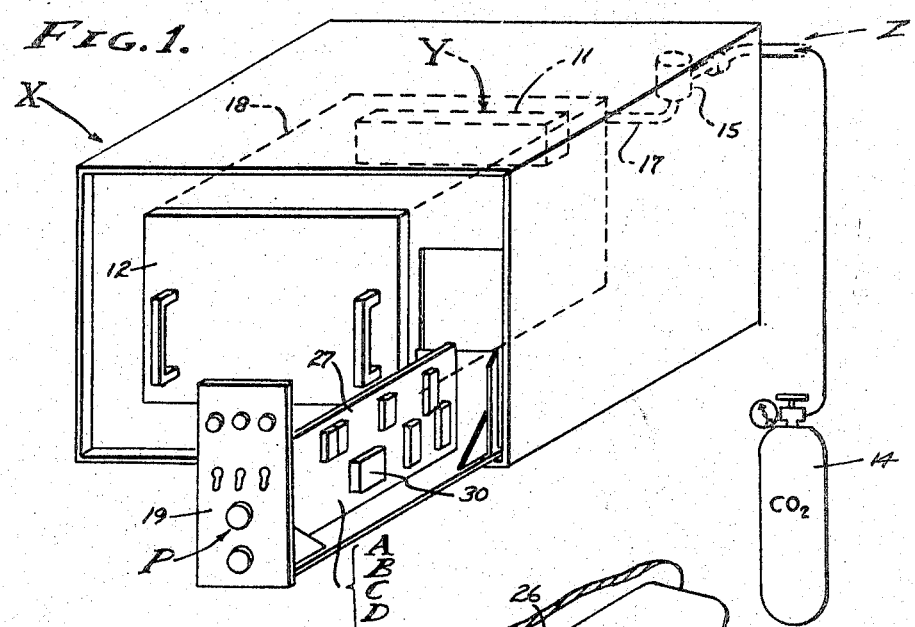
FIG. 1 is a perspective view showing an environmental testing chamber, for heating and cooling, and which incorporates the features of the present invention.

The electronic control of the present invention is shown applied, for example, to an invironmental temperature testing chamber X which involves a heating means Y and a cooling means Z. The heating means Y involves a Nichrom resistance element 10 supported upon a ceramic bobbin or holder 11 and in an A.C. power circuit that is opened and closed by a solid state contactor 53 (later described). The cooling means Z utilizes a liquid that is expanded into gas in order to absorb heat and involves a supply 14 of compressed or liquid $CO_2$ or $N_2$ and a normally closed discharge valve 15 opened by a solid state contactor 53' (also later described). The heating element 10 and expansion nozzle 17 of the cooling means Z are preferably within an adjacent plenum that remains in open communication with the chamber. As shown, the environmental temperature testing chamber X is a unit which encloses the chamber 18 within insulated walls, and which houses the control of the present invention with the manually operable parts thereof exposed at the front face 19 of the unit, where there is also an insulated door that closes the chamber per se.

In accordance with this invention there is provided an electronic control which activates either the heating means Y or cooling means Z and/or which withholds operation of both, and which is characterized by a resistance comparator means A, an amplification means B, demodulation means C, and null detection means D. The means A is provided so as to compare the resistance of a temperature sensor S to the resistance of a potentiometer P that is manually set or otherwise positioned, and produces a modulated signal output with a phase and amplitude as determined by a chopper and the relationship of the said sensor resistance to the said potentiometer resistance. The amplifier B is provided to increase the signal or amplitude level of the means A output, the phase character remaining unchanged. The means C is a dual channel means adapted to process both hot cold requirement, and involves two like demodulator circuits that are each sensitive to opposite phases of the modulated signal output of the comparator means A and which are also responsive to the signal amplitudes thereof. Further, each demodulator channel involves a solid state power contactor 53 and 53' respectively, associated with the means Y and Z as above described. The null detector means D, as above mentioned, is operable to close an auxiliary circuit when the temperature condition being measured is equal to the temperature selected.

Figure 2:
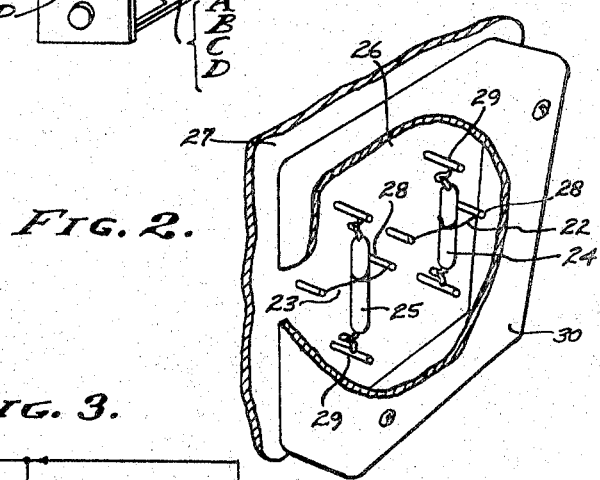
FIG. 2 is an enlarged perspective view with a portion broken away so as to expose and illustrate a characteristic feature of the present invention.
Figure 3:
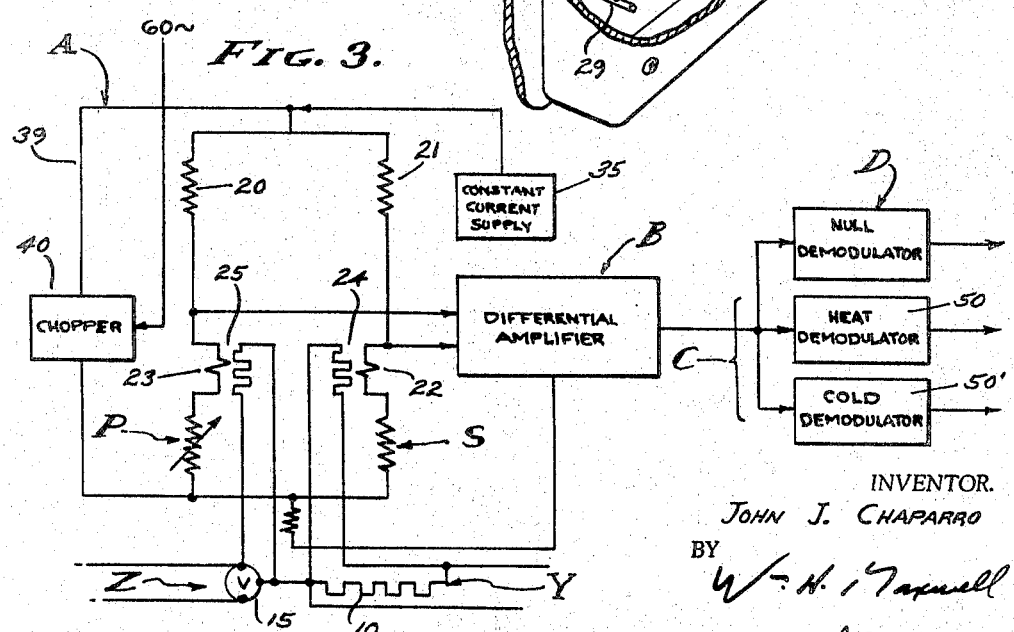
FIG. 3 is a schematic and block diagram of the electrical circuitry of the present invention.

The comparator means A (FIG. 3) that produces a modulated signal related to temperature involves, generally, a constant current four arm bridge and includes therein the sensor S, a potentiometer P, and fixed resistance legs 20 and 21. In accordance with the invention there are heat sensitive variable resistance elements 22 and 23 in series with the sensor S and with the potentiometer P respectively, the element 22 being the heat anticipator and the element 23 being the cold anticipator, and each of which is temperature responsive. In practice, the resistance elements 22 and 23 each involves a single turn of Nickle wire wound onto an insulated heater resistor 24 and 25 respectively (FIG. 2). The heater resistor 24 is in parallel with the chamber heater element 10 while the heater resistor 25 is in parallel with the solenoid valve 15. Therefore, the two heater resistors 24 and 25 function individually when their respective sources 10 and 15 are electrically activated.

In accordance with this invention the heater resistors 24 and 25 and the variable resistance elements 22 and 23 are cooperatively related by means of their close association as a combination of elements. The general electrical and physical relationship is set forth above, however a feature of the invention is the common environmental association of these elements whereby opposite bridge elements balance each other as when there are changes in ambient temperature. Therefore, balance is simulated before the sensor S would normally effect such a balance. For example if there were but one heater resistor 24 or 25 wrapped with but one heat sensitive variable resistance element 22 or 23, and not environmentally associated, the expected simulation would occur too quickly because of the differential or anticipation created thereby, and as a result the temperature sensitive resistor will heat excessively due to a lengthy exposure to the activated heater resistor. This would occur periodically and would cause extreme hunting characteristics which would diminish slowly before the control and chamber would reach a reasonably stable condition. It is to be understood that the above explanation relates to prior art devices of the type under consideration wherein anticipators are employed but which are not thermo compensated as will now be described.

As is pointed out above, the heat anticipator involves the heat sensitive element 22 associated with the heater resistor 24 so as to be heated thereby when the heater element 10 is activated; and the cold anticipator involves the heat sensitive element 23 associated with the heater resistor 25 so as to be heated thereby when the solenoid valve 15 is activated. Thus, the two anticipators remain independently operable but according to this invention they are environmentally associated so that each has physical effect upon the other. As is clearly shown in FIG. 2 of the drawings the combined elements and heater 22–24 and 23–25 are located closely to each other in order for one to influence the other. That is, while each anticipator operates exclusive of the other its generation of heat is transferred to the other. The significance of this relationship relates to the simulation in balance of the bridge circuit which would indicate a balanced condition too quickly without the thermo compensation now being described. In practice, the heaters 24 and 25 are of substantial resistance and therefore produce measurable quantity of heat, while the heat sensitive resistances 22 and 23 are of a delicate nature and therefore respond quickly to small changes in temperature produced by the said heaters.

In carrying out the invention a satisfactory close association of the two anticipators is gained by utilizing the ambient surrounding air as the medium for heat exchange, since each resistance element 22 and 23 is readily responsive to surrounding air temperature as well as being responsive to the heaters upon which they are wrapped. Consequently, the two anticipators are arranged side-by-side, as shown, so as to have effect one upon the other. Further, the interheating effect of the two anticipators is made more effective by enclosing and isolating the two anticipators within a common plenum 26 shielded from the surrounding atmosphere. In the preferred form, the electronic circuitry involves a printed circuit board 27 of epoxy material which is relatively non heat conductive. The heat sensitive resistances 22 and 23 are extended between supporting posts 28 that are joined into the printed circuit, while the resistance heaters 24 and 25 are extended between supporting posts 29 that are connected by heavier wire to the heater element 10 and solenoid valve 15, respectively.

The plenum 26 is established by a housing or cover 30 of high heat conductive material (such as .064 inch aluminum) closely embracing the two anticipators, all to the end that heat generated at either anticipator will be transmitted throughout the plenum 26 so as to affect the other anticipator. Therefore, opposite legs of the bridge circuit are affected one by the other so as to tend to balance each other by the effect of said heat transfer, whereby the normal differential in balance is lessened. However, a differential will always exist, since the anticipator which is being heated directly by its resistor heater will necessarily have the greater effect of the balance of the bridge.

The comparator means A (FIG. 4) involves a constant current supply 35 of direct current for its operation and which is shown as a transistorized supply in which the output is the collector terminal of a transistor that is connected into a circuit so as to maintain a constant current flowing in the collector, and which is very insensitive to the magnitude of the resistance connected to the collector circuit. The circuit involves a voltage divider comprised of resistances 36 and 37 and a transistor 38 with its base connected to the junction of the divider and with its emitter connected to a resistor 32 at one side 33 of the direct current supply (the positive side) and with the collector acting as the source of current connected to the other side 34 of the direct current supply (the negative side) feeding the bridge circuit.

The comparator means A involves a chopper 40 that opens and closes a shunt 39 extended across the bridge circuit. The chopper 40 is cycled as by means of the sixty cycle power which is available to power the entire apparatus and involves a transistor clamp that bi-passes the constant current around the bridge at said sixty cycle rate. As shown, there are two transistors 41 and 42, transistor 41 to clamp as a switch and the transistor 42 to turn off the former. Transistor 41 is wired with its collector connected to the positive side of the bridge, with its emitter connected to the negative side of the bridge, and with its base connected to a resistor 43 supplying current thereto. Transistor 42 has its collector connected to the base of transistor 41, its emitter to the return of the voltage supply, and its base through a resistor to a source of sixty cycle voltage. Therefore, the chopper 40 operates to alternately bi-pass the constant current around the bridge circuit at a constant sixty cycle rate.

With the comparator circuit thus far described there are basically three possible conditions: (1) where there is zero differential as a result of balance, (2) where there is an excessive heat differential as a result of imbalance caused by greater resistance in the sensor S than in the potentiometer P, and (3) where there is an excessive cold differential as a result of imbalance caused by lesser resistance in the sensor S than in the potentiometer P. Operationally, voltage is produced in the bridge by the constant direct current fed thereto when the chopper is open, which divides the opposite sides of the bridge.

(1) Current flows through the sensor S and its anticipator 22 associated with the heater 24 providing a voltage drop across the heat sensitive resistance 22 and the sensor S, in which case there is an equal voltage drop across the heat sensitive resistor 23 and the potentiometer P. Thus, with equal voltage drop at resistances 22 and 23 there is zero differential voltage between the two, and a null signal results. Following this, the chopper clamps so as to bi-pass the constant current and the bridge remains at zero differential and null.

(2) When conditions within chamber 18 overheat (relative to the setting of potentiometer P) the sensor S, the resistance of sensor S is greater than that of the potentiometer P in which case there is a greater voltage drop across the sensor S and its heat sensitive resistance 22 than there is across the potentiometer P and its heat sensitive resistance 23, only when the chopper is unclamped. As a result a differential voltage appears as a "TOO HOT" signal across the bridge, followed by clamping of the chopper which causes the differential voltage to vary from the value proportional to the unbalance between the sensor and the potentiometer to zero or null. And, this produces a differential alternating current of square wave form with a peak amplitude proportional to the unbalance between the sensor and potentiometer legs of the bridge.

(3) When conditions within the chamber 18 overcool (relative to the setting of potentiometer P) the sensor S, the resistance of sensor S is less than that of the potentiometer P in which case there is a lesser voltage drop across the sensor S and its heat sensitive resistance 22 than there is across the potentiometer P and its heat sensitive resistance 23, only when the chopper is unclamped. As a result, the differential voltage appears as a "TOO COLD" signal across the bridge, followed by clamping of the chopper which causes the differential voltage to vary from a value proportional to the unbalance between the sensor and the potentiometer to zero or null. And, this produces a differential alternating current of square wave form with a peak amplitude proportional to the unbalance between the sensor and potentiometer legs of the bridge.

The amplification means B that is provided to increase the signal or amplitude level of the above described three possible signals from the comparator means A is a high gain differential amplifier, an amplifier which augments signal differences. The means B can comprise any reasonably good quality amplifier of the type required having high common mode rejection so as to ignore non-differences, such as a common mode signal produced when the bridge is at null. Thus, the signal from the comparator means A is magnified in differential at it is processed in the amplification means B.

The demodulation means C that is adapted to process both the "TOO HOT" and the "TOO COLD" signals involves two essentially identical channels, each sensitive to an opposite half of the operative cycle established by the chopper 40. To this end the demodulator means C involves dual channels 50 and 50' asynchronously activated by relatively reversed connections to the sixty cycle power source. The two channels 50 and 50' can be identical and each involves, generally, a peak detection circuit with a synchronized clamp transistor 51 and 51' which provides phase selectivity for the said detection circuit. Each channel 50 and 50' has a voltage threshold at which it operates to close a read relay 52 and 52'. Thus, each channel 50 and 50' is effective to operate a relay 52 or 52' during a different and opposite half of the full operative cycle.

The above mentioned solid state contactors 53 and 53' are provided to eliminate arcing and involve the use of silicon controlled rectifiers. The contactor 53 controls the power circuit to the heater element 10 and includes a rectifier 54 in each of the two conductors of said power circuit, and in this instance each rectifier 54 is turned on by and is activated by closing of the reed relay 52. Diodes 55 are included in the circuit in order to protect the silicon controlled rectifiers. The contactor 53 controls the power circuit to the solenoid valve 15 and includes a silicon controlled rectifier 54' in one of the two conductors of the power circuit, and in this instance the bridge of diodes 53'' is activated by the silicon controlled rectifier 54' being turned on by the closing of the reed relay 52'.

The null detection means D involves a voltage doubler detection circuit wherein the output is fed through a voltage divider that is sensitive by means of a transistorized circuit to the signal from the comparator means A to operate a reed relay 60 upon a predetermined departure of the signal from the zero or null setting. Thus, upon departure from the null condition within the chamber 18, the null detection means D operates to open the reed relay 60 in order to deactivate any auxiliary equipment controlled by connection thereto.

From the foregoing it will be clear that the present invention involves a constant current supplied bridge circuit wherein said constant current thereto is interrupted at a constant rate, and wherein the said bridge has thermocompensated anticipators. As a result, the modulation signal produced for amplification and subsequent demodulation is of improved character and makes possible the direct approach to the zero or null condition, with accuracy virtually devoid of hunting.

Having described only a typical preferred form and application of my invention, I do not wish to be limited or restricted to the specific details herein set forth, but wish to reserve to myself any modifications or variations that may appear to those skilled in the art:

Having described my invention, I claim:

1. In an electronic comparator independently sensitive to two devices of opposite effect and having two heat sensitive resistances and each associated with a heater operative with one of said devices respectively, closely relating said two heat sensitive resistances and the heaters associated therewith, so that heat generated at one of said heat sensitive resistances is radiated to and absorbed by the other heat sensitive resistance, whereby imbalance as between the two heat sensitive resistance is reduced.

2. The electronic comparator as set forth in claim 1 and wherein, the two heat sensitive resistances are separated and with their respective heaters are enclosed within a cover isolating said resistances and heaters from the surrounding ambient atmosphere.

3. The electronic comparator as set forth in claim 1 and wherein, the two heat sensitive resistances are separated and with their respective heaters are enclosed within a closely surrounding cover of heat conductive material isolating said resistances and heaters from the surrounding ambient atmosphere.

4. In an electronic comparator independently sensitive to two devices of opposite effect and having a bridge circuit with two heat sensitive resistances and each associated with a condition anticipator comprising a heater operative with one of said devices respectively and activated by operation of said device to effect a condition to be sensed by the circuit, closely relating said two heat sensitive resistances and the respective heaters associated therewith, so that heat generated at one of said heat sensitive resistances is radiated to and absorbed by the other heat sensitive resistance, whereby imbalance in the bridge is reduced.

5. The electronic comparator having a bridge as set forth in claim 4 and wherein, the two heat sensitive resistances are separated and are each associated with a condition anticipator comprising a heater activated by operation of said device affecting a condition to be sensed by the circuit, and wherein the two heat sensitive resistances and their respective heaters are enclosed within a cover isolating said resistances and heaters from the surrounding ambient atmosphere.

6. The electronic comparator having a bridge as set forth in claim 4 and wherein, the two heat sensitive resistances are separated and are each associated with a condition anticipator comprising a heater activated by operation of said device affecting a condition to be sensed by the circuit, and wherein the two heat sensitive resistances and their respective heaters are enclosed within a closely surrounding cover of heat conductive material isolating said resistances and heaters from the surrounding ambient atmosphere.

References Cited
UNITED STATES PATENTS 2,769,071  10/1956  Ward.

LEE T. HIX, Primary Examiner

G. GOLDBERG, Assistant Examiners

U.S. Cl. X.R.

323—75